US008060050B2

(12) United States Patent
Chen et al.

(10) Patent No.: US 8,060,050 B2
(45) Date of Patent: Nov. 15, 2011

(54) METHOD AND SYSTEM FOR ANALOG AND DIGITAL RF RECEIVER INTERFACE (75) Inventors: Yue Chen, Fremont, CA (US); Nelson Sollenberger, Farmingdale, NJ (US); Minsheng Wang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 2160 days.

(21) Appl. No.: 10/926,763

(22) Filed: Aug. 26, 2004

(65) Prior Publication Data

US 2005/0272400 A1 Dec. 8, 2005

Related U.S. Application Data (60) Provisional application No. 60/577,270, filed on Jun. 4, 2004.

(51) Int. Cl.
H04B 1/16 (2006.01)

(52) U.S. Cl. .................. 455/337; 455/164.2; 455/165.1; 455/334; 375/340

(58) Field of Classification Search .............. 455/161.1, 455/164.1, 164.2, 165.1, 280, 281, 323, 324, 455/334, 337; 375/340
See application file for complete search history.

(56) References Cited

U.S. PATENT DOCUMENTS

| 5,436,942 | A | | 7/1995 | Cheng | |
|---|---|---|---|---|---|
| 5,550,869 | A | * | 8/1996 | Gurantz et al. | 375/340 |
| 5,708,442 | A | * | 1/1998 | Whelan et al. | 342/375 |
| 6,028,460 | A | * | 2/2000 | McCollum et al. | 327/105 |
| 6,084,923 | A | * | 7/2000 | Cullen | 375/329 |
| 6,687,315 | B2 | * | 2/2004 | Keevill et al. | 375/341 |
| 7,173,982 | B1 | * | 2/2007 | Yang et al. | 375/329 |
| 2002/0016158 | A1 | * | 2/2002 | Shibuya et al. | 455/232.1 |
| 2002/0067845 | A1 | * | 6/2002 | Griffis | 382/107 |
| 2003/0087622 | A1 | * | 5/2003 | Jayaraman et al. | 455/307 |
| 2003/0210757 | A1 | * | 11/2003 | Chen et al. | 375/354 |

(Continued)

FOREIGN PATENT DOCUMENTS

CN 1353884 A 6/2002

(Continued)

OTHER PUBLICATIONS

Wilkins, Ed B.—Quach T.—Institute of Electrical and Electronics Engineers: "Polaris total radio, a highly integrated RF solution for GSM/GPRS and EDGE" 2003 IEEE Radio Frequency Integrated Circuits Symposium.New York, NY Jun. 8, 2003.

(Continued)

Primary Examiner — Nhan Le
(74) Attorney, Agent, or Firm — McAndrews, Held & Malloy, Ltd.

(57) ABSTRACT

In a wireless device, a method and system for a baseband receiver interface including analog and digital components are provided. An analog or a digital interface may be selected for a I/Q data signal received from a front-end receiver. The analog interface may be a conventional RF or a VLIF interface. The I/Q data signal may be digitized when received from the analog interface and saturation detection may be used during digitization of the I/Q data signal. When the analog interface is the VLIF interface, a derotator may be used to remove the VLIF frequency. The derotator may be based on a CORDIC algorithm. The I/Q data signal may be converted from serial to parallel format when received from the digital interface. The received I/Q data signal may be decimated before transferred to a baseband processor.

25 Claims, 4 Drawing Sheets

U.S. PATENT DOCUMENTS

2004/0106380 A1*  6/2004  Vassiliou et al. ............... 455/73
2005/0190867 A1*  9/2005  Sobchak et al. ............. 375/346

FOREIGN PATENT DOCUMENTS

| CN | 1378734 A | 11/2009 |
| EP | 0595781 A | 5/1994 |
| WO | 046901 A2 | 6/2004 |

OTHER PUBLICATIONS

European Search Report corresponding to European Patent Application Serial No. 05010250.8-2415, dated Feb. 12, 2009.

* cited by examiner

METHOD AND SYSTEM FOR ANALOG AND DIGITAL RF RECEIVER INTERFACE

CROSS-REFERENCE TO RELATED APPLICATIONS/INCORPORATION BY REFERENCE

This application makes reference to, claims priority to, and claims the benefit of U.S. Provisional Application Ser. No. 60/577,270, entitled "Method and System for Improved RF Receiver Interface Including Improved Analog and Digital Component," filed on Jun. 4, 2004.

The above stated application is hereby incorporated herein by reference in its entirety.

FIELD OF THE INVENTION

Certain embodiments of the invention relate to the processing of received radio frequency signals. More specifically, certain embodiments of the invention relate to a method and system for an RF receiver interface including analog and digital components.

BACKGROUND OF THE INVENTION

In wireless applications, wireless and/or handheld devices may require sufficient design flexibility to have their data processing hardware interface to a plurality of RF front-end receivers. The baseband signal from an RF front-end receiver may be in the form of an in-phase (I) component and a quadrature (Q) component, generally referred to as an I/Q data signal, and there may be a need to process the amplitude, phase, frequency, and/or sampling rate of these signal components before they reach a baseband processor. For this purpose, a baseband receiver interface may be used to interface RF front-end receivers with baseband processors and/or other data processing blocks in a wireless device.

As the operating requirements for wireless devices become more demanding, the complexity of the interactions between data processing hardware and RF front-end receivers also increases. For example, RF front-end receivers from various vendors may be required to work effectively with a baseband processor from a different vendor. The use of individual baseband receiver interfaces for each of the possible RF front-end receivers with which a baseband processor may interface, may prove to be costly in terms of layout space in an integrated circuit. Because component size and cost are critical concerns in wireless devices, the use of multiple baseband receiver interfaces should be limited as much as possible. Moreover, this approach may also limit the number of possible interfaces that may be implemented with a particular baseband processor.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for an analog and digital RF receiver interface. Aspects of the method may comprise selecting between an analog interface and a digital interface to receive an I/Q data signal from a front-end receiver and decimating the received I/Q data signal before transferring to a baseband processor. The analog interface may be selected from a conventional analog interface or a very low intermediate frequency (VLIF) analog interface. The I/Q data signal received from the analog interface may be digitized, and saturation in the digitization of the I/Q data signal may be detected when a determined average value is greater than a threshold value. The I/Q data signal received from the digital interface may be converted from a digital serial format to a digital parallel format.

The method may also comprise removing a VLIF frequency when the selected analog interface is a VLIF analog interface. Removal of the VLIF frequency may be performed by a derotation function based on a CORDIC algorithm. The VLIF frequency may be programmable, and phase and phase increment values for the VLIF frequency may be determined. The phase may be normalized to the first Cartesian field and may be assigned a sign value. In the derotation function, output parameters may be normalized before assigning those parameters to corresponding outputs according to the sign value.

Aspects of the system may comprise at least one processor that selects between an analog interface and a digital interface to receive an I/Q data signal from a front-end receiver and a baseband receiver interface that decimates the received I/Q data signal before transferring to a baseband processor. The baseband receiver interface may comprise an analog filter, an analog-to-digital converter, a saturation detector, a plurality of digital decimators, a plurality of multiplexers, a derotator, a VLIF source, and a serial-to-parallel converter.

The analog interface may be selected by the processor from a conventional analog interface or a VLIF analog interface. The I/Q data signal received from the analog interface may be digitized by an analog-to-digital converter and saturation in the digitization of the I/Q data signal may be detected by a saturation detector when a determined average value is greater than a threshold value. The I/Q data signal received from the digital interface may be converted from a digital serial format to a digital parallel format by a serial-to-parallel converter.

The system may also comprise a derotator that removes a VLIF frequency when the selected analog interface is a VLIF analog interface. The derotator may be based on a CORDIC algorithm. The VLIF frequency may be programmed into a memory and phase and phase increment values for the VLIF frequency may be determined by the processor. The processor may normalize the phase to the first Cartesian field and may assign a sign value. The derotator may normalize output parameters before assigning those parameters to corresponding outputs according to the sign value.

These and other advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for an improved RF receiver interface including improved analog and digital components. A baseband receiver interface may be used to interface an RF front-end receiver with a baseband processor. The baseband receiver interface may select between receiving an I/Q data signal from a programmable analog interface or from a programmable digital interface. The analog interface may receive a conventional RF I/Q data signal or a very low intermediate frequency (VLIF) I/Q data signal. This approach provides a cost-effective and flexible architecture for a baseband receiver interface.

Figure 1:
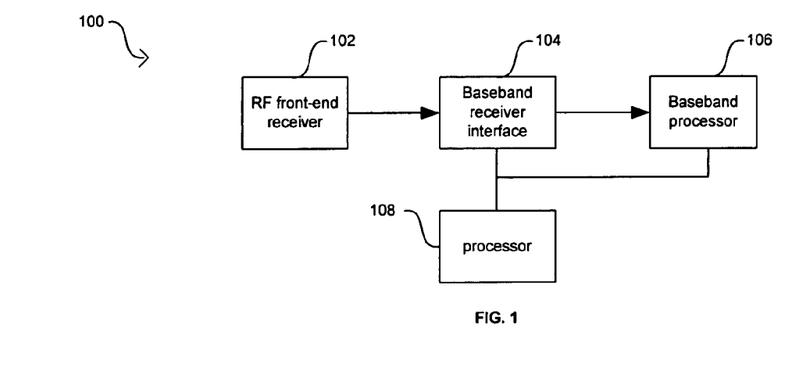
FIG. 1 illustrates a block diagram of an exemplary RF interface to a baseband processor, in accordance with an embodiment of the invention.

FIG. 1 illustrates a block diagram of an exemplary RF interface to a baseband processor, in accordance with an embodiment of the invention. Referring to FIG. 1, a wireless receiver system 100 may comprise an RF front-end receiver 102, a baseband receiver interface 104, a baseband processor 106, and a processor 108. The RF front-end receiver 102 may comprise suitable logic, circuitry, and/or code and may be adapted to receive an I/Q data signal transmitted through a wireless medium. The baseband receiver interface 104 may comprise suitable logic, circuitry, and/or code and may be adapted to process the received I/Q data signal and to transfer the processed received I/Q data signal to the baseband processor 106. The processing performed by the baseband receiver interface 104 may be programmable and may comprise processing of I/Q data signal in an analog format and/or in a digital format. The processor 108 may comprise suitable logic, circuitry, and/or code and may be adapted to control the operation of the baseband receiver interface 104. The processor 108 may be used to program analog and digital components of the baseband receiver interface 104 and to select from the plurality of interface modes that may be available in the baseband receiver interface 104. The baseband processor 106 may comprise suitable logic, circuitry, and/or code and may be adapted to provide additional processing to the processed I/Q data signal transferred from the baseband receiver interface 104.

Figure 2:
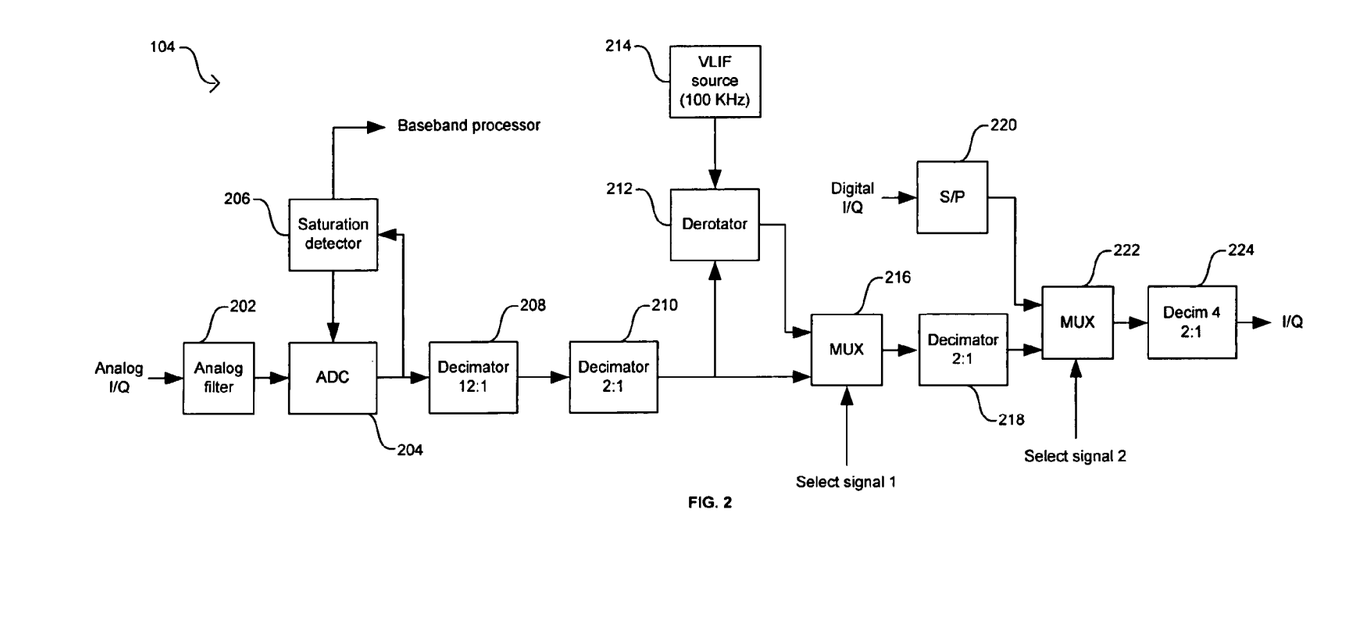
FIG. 2 illustrates a block diagram of an exemplary baseband receiver interface, in accordance with an embodiment of the invention.

FIG. 2 illustrates a block diagram of an exemplary baseband receiver interface, in accordance with an embodiment of the invention. Referring to FIG. 2, the baseband receiver interface 104 may comprise an analog filter 202, an analog-to-digital converter (ADC) 204, a saturation detector 206, a first decimator 208, a second decimator 210, a derotator 212, a VLIF frequency source 214, a first multiplexer (MUX) 216, a third decimator 218, a serial-to-parallel converter (S/P) 220, a second MUX 222, and a fourth decimator 224.

The analog filter 202 may comprise suitable logic, circuitry, and/or code and may be adapted to receive an analog I/Q data signal and to filter out frequencies that may lie outside the baseband range of frequencies. The ADC 204 may comprise suitable logic, circuitry, and/or code and may be adapted to digitize the filtered analog I/Q data signal. The ADC 204 may be, for example, an oversampling ADC and may comprise a sigma-delta ($\Sigma\Delta$) modulator. The ADC 204 may be a programmable ADC where the sampling rate may be controlled by the processor 108. For example, the sampling rate of the ADC 204 may be, but is not limited to, 13 MHz or 26 MHz.

The saturation detector 206 may comprise suitable logic, circuitry, and/or code and may be adapted to detect whether the I/Q data signal level is sufficiently high that it may be saturating the ADC 204. After ADC 204 starts to convert the I/Q data signal, the saturation detector 206 may average, for example, 50 absolute samples. The saturation detector 206 may determine that the ADC 204 is saturated when the average value is greater than a threshold for either the I component or the Q component. When the ADC 204 is saturated, the input to the ADC 204 may be reduced by lowering the front gain and/or it may be shortened by, for example, 16 or 32 clock cycles. After that, the saturation detector 206 may be reset and may start to accumulate samples again.

The first decimator 208 may comprise suitable logic, circuitry, and/or code and may be adapted to decimate the sampled I/Q data signal from the ADC 204. The first decimator 208 may be, for example, 12-to-1 (or 12:1) decimator implemented utilizing a third order SINC filter with a transfer function given by $H(z)=((1-z^{-12})/(1-z^{-1}))^3$. For example, when the ADC 204 samples an incoming analog I/Q data signal at 13 MHz, the output signal of the first decimator 208 has a sampled rate of 13/12 MHz or 1.0833 MHz after the 12:1 decimation. The input to the first decimator 208 may be, for example, a 4-bit input value and the output may be a 15-bit output value. The decimation ratio for the first decimator 208 may be programmable and may be programmed via the processor 108. The processor 108 may determine the appropriate filter coefficients for the first decimator 208 in accordance with programming instructions.

The second decimator 210 may comprise suitable logic, circuitry, and/or code and may be adapted to decimate the signal transferred from the first decimator 208. The second decimator 210 may be, for example, a 2:1 decimator implemented utilizing a finite impulse response (FIR) filter with 25 taps, in which the maximum tap value is 2047. In this exemplary configuration, the input is 16-bit values and the output may be downshifted 11 bits and then rounded and saturated to a 16-bit output value. The filter coefficients used for implementing the second decimator 210 as an FIR filter may be programmable and may be programmed via the processor 108. The processor 108 may determine the appropriate filter coefficients for the second decimator 210 in accordance with programming instructions. The filter coefficients for the second decimator 210 may be, for example, 12-bit values. The first decimator 208 and the second decimator 210 may be implemented as a single decimator block.

The derotator 212 may comprise suitable logic, circuitry, and/or code and may be adapted to remove the VLIF frequency from the digitized analog I/Q data signal. The derotation function may be expressed as follows:

$$\left\{ \begin{array}{c} O_x(t) \\ O_y(t) \end{array} \right\} = \left\{ \begin{array}{c} I_x(t)\cos(\theta(t)) - I_y(t)\sin(\theta(t)) \\ I_x(t)\sin(\theta(t)) + I_y(t)\cos(\theta(t)) \end{array} \right\},$$

where $I_x(t)$ and $I_y(t)$ are the inputs to the derotator 212 and correspond to the I and Q data signal components respectively, $O_x(t)$ and $O_y(t)$ are the outputs and correspond to the frequency-shifted values I and Q data signal components respectively, and $\theta(t)$ is an angle between 0-360 degrees. The expression for the derotation function may not require separate determination of the $\cos(\theta(t))$ and the $\sin(\theta(t))$ because the expression may be determined by utilizing a coordinate rotations digital computer (CORDIC) algorithm. In this exemplary implementation, the angle θ(t) may be represented by a 17-bit value and the inputs and outputs of the derotator 212 may be 16-bit values. The angle θ(t) may be expressed as θ(t)=θ(t−1)+Δθ, where Δθ may represent a phase increment with each sampling period and may be stored in a register in the VLIF source 214. For example, for a frequency bandwidth of 100 KHz and a sampling rate of 13/12 MHz, then Δθ=12099. In this exemplary implementation, when θ(t)>$2^{17}$, then θ(t)=θ(t)−$2^{17}$ and when θ(t)<0, then θ(t)=θ(t)+$2^{17}$; the value of θ(t) may also be determined as:

$$\theta(t) = \begin{cases} \theta(t-1) + \Delta\theta & \Delta\theta > 0 \\ \theta(t-1) + 2^{17} + \Delta\theta & \Delta\theta < 0 \end{cases}.$$

The VLIF source 214 may comprise suitable logic, circuitry, and/or code and may be adapted to store information on the value of the VLIF frequency to be used by the derotator 212. The first MUX 216 may comprise suitable logic, circuitry, and/or code and may be adapted to select utilizing select signal 1, whether a conventional RF baseband analog interface or a VLIF analog interface may be utilized for RF front-end receiver 102 with the baseband processor 106. The conventional RF baseband analog interface may refer to the direct path from the second decimator 210 to the first MUX 216. The VLIF analog interface may refer to the path taken by the I/O data signal from the second decimator 210 through the derotator 212 to the first MUX 216. The processor 108 may select the path utilizing select signal 1 in accordance to the RF front-end receiver 102 providing the analog I/Q data signal to the baseband receiver interface 104.

The third decimator 218 may comprise suitable logic, circuitry, and/or code and may be adapted to decimate the signal transferred from the first MUX 216. The third decimator 218 may be, for example, a 2:1 decimator implemented utilizing a finite impulse response (FIR) filter with 32 taps, in which the maximum tap value is 2047. In this exemplary configuration, the input is 16-bit values and the output may be downshifted 11 bits and then rounded and saturated to a 16-bit output value. The filter coefficients used for implementing the third decimator 218 as an FIR filter may be programmable and may be programmed via the processor 108. The processor 108 may determine the appropriate filter coefficients for the third decimator 218 in accordance with programming instructions. The filter coefficients for the third decimator 218 may be, for example, 12-bit values.

The S/P 220 may comprise suitable logic, circuitry, and/or code and may be adapted to convert a serial digital I/Q data signal into a parallel digital I/Q data signal. The digital I/Q data signal input may come, for example, from an RFMD RF chip and the S/P 220 may provide a 16-bit I/Q data signal as an output after serial-to-parallel conversion. In the exemplary case of an RFMD RF chip acting as the RF front-end receiver 102, there may be a plurality of signals that may be used by the processor 108 to support a digital I/Q data signal input. These signals may be ENR, CLKR, FSR, DRI and DRQ. The signal ENR may be used to enable an interface to an RFMD standard serial interface (SSI) bus. The signal CLKR may be utilized as a clock input for serial data transfer. The signal FSR may be utilized as a frame synchronization input for serial data transfer. The signals DRI and DRQ may be utilized as the serial digital I/Q data signal inputs. For example, the SSI bus may provide two samples of I and two samples of Q for each GSM symbol period. The input data pattern on DRI may be 16 bits of I data followed by 8 blank bits, while the input data pattern for DRQ may be 16 bits of Q data followed by 8 blank bits. The FSR may be 13/24 MHz or 541.667 KHz when the sampling rate of the ADC 204 is 26 MHz and may be used to mark the beginning of the I and Q data transfer, while the CLKR may be 13 MHz.

The second MUX 222 may comprise suitable logic, circuitry, and/or code and may be adapted to select utilizing select signal 2 whether an analog interface or a digital analog interface may be utilized to interface the RF front-end receiver 102 with the baseband processor 106. The analog interface may refer to the path taken by the analog I/Q data signal through the third decimator 218 and the digital interface may refer to the path taken by the digital I/Q data signal taken through the S/P 220.

The fourth decimator 224 may comprise suitable logic, circuitry, and/or code and may be adapted to decimate the signal transferred from the second MUX 222. The fourth decimator 224 may be, for example, a 2:1 decimator implemented utilizing a finite impulse response (FIR) filter with 32 taps, in which the maximum tap value is 4082. In this exemplary configuration, the input is 16-bit values and the output may be downshifted 13 bits and then rounded and saturated to a 16-bit output value. The filter coefficients used for implementing the fourth decimator 224 as an FIR filter may be programmable and may be programmed via the processor 108. The processor 108 may determine the appropriate filter coefficients for the fourth decimator 224 in accordance with programming instructions. The filter coefficients for the fourth decimator 224 may be, for example, 13-bit values. The output of the fourth decimator 224 may be transferred to the baseband processor 106. The fourth decimator 224 may provide the final reduction in sampling rate so that the I/Q data signal transferred to the baseband processor 106 may be of the appropriate rate.

Figure 3:
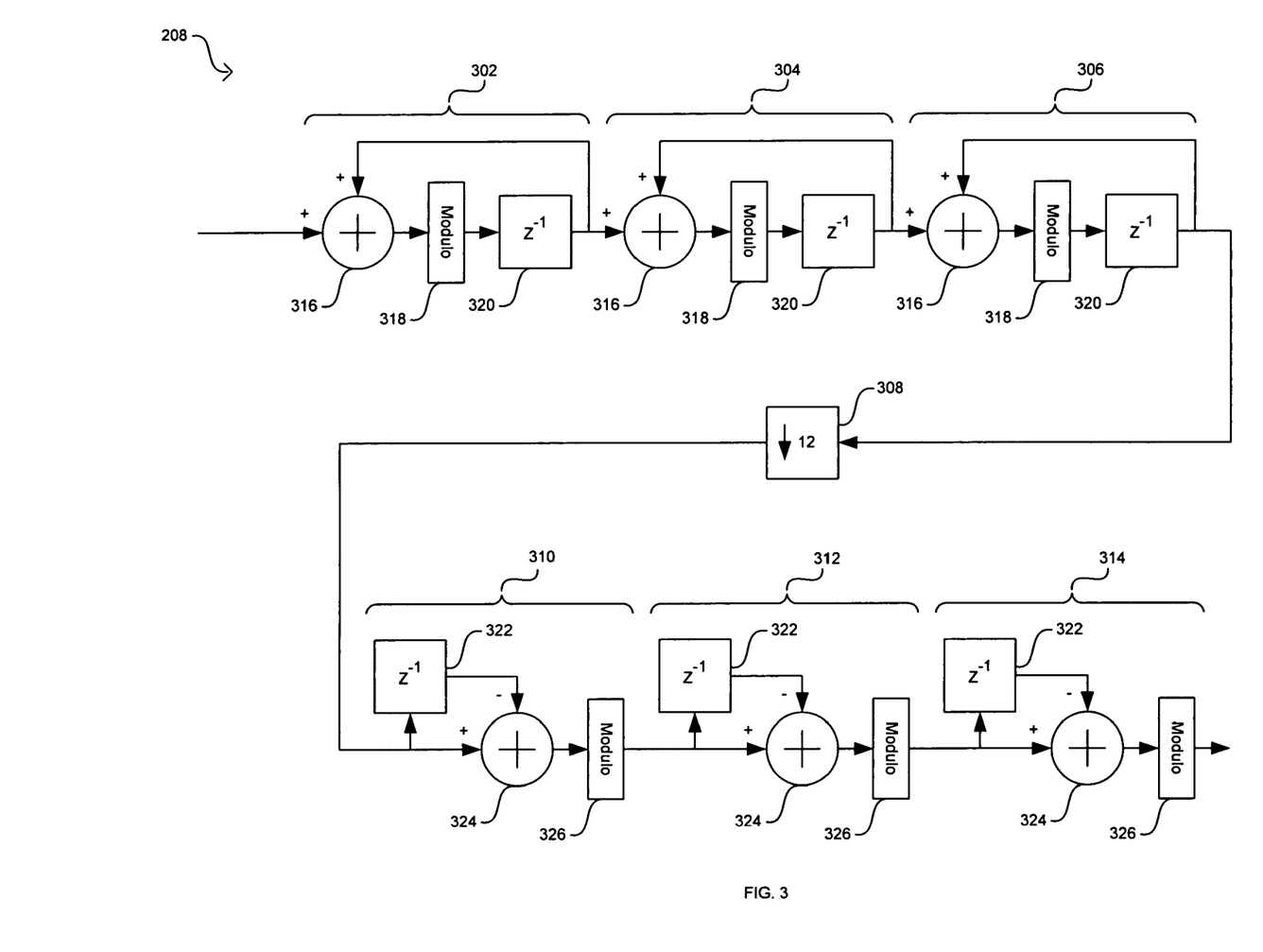
FIG. 3 illustrates a block diagram of an exemplary implementation of the first decimator, in accordance with an embodiment of the invention.

FIG. 3 illustrates a block diagram of an exemplary implementation of the first decimator, in accordance with an embodiment of the invention. Referring to FIG. 3, a third order SINC filter implementation of the first decimator 208 may comprise integrators 302, 304, 306, a downsampler 308, and differentiators 310, 312, 314. The integrators 302, 304, 306 may comprise an adder 316, a modulo operator 318, and delay ($z^{-1}$) 320. The differentiators 310, 312, 314 may comprise a delay ($z^{-1}$) 322, an adder 324, and a modulo operator 326. The differentiators 310, 312, 314 may perform the operation of a 3-stage comb filter.

The adder 316 may comprise suitable logic, circuitry, and/or code and may be adapted to add the input and output of the integrators 302, 304, 306. In this exemplary implementation of the integrator 302, the input may be a 4-bit value and the output from the delay ($z^{-1}$) 320 may be a 15-bit value. For the integrators 304, 306, the inputs may be 15-bit values and the outputs may also be 15-bit values. The delay ($z^{-1}$) 320 may comprise suitable logic, circuitry, and/or code and may be adapted to provide a one unit of time delay. In an exemplary implementation of the delay ($z^{-1}$) 320, the input may be a 15-bit value and the output may be a 15-bit value. The modulo operator 318 may comprise suitable logic, circuitry, and/or code and may be adapted to assign x=x−$2^{15}$ when x>$2^{14}$−1 and x=x+$2^{15}$ when x<−$2^{14}$, where x is the input to the modulo operator 318.

The downsampler 308 may comprise suitable logic, circuitry, and/or code and may be adapted to downsample a digital signal. In this exemplary implementation of the first decimator 208, the downsampler 308 performs a 12-bit downsampling of the output of the integrator 306. In alternative implementations, where the first decimator 208 may have different decimation ratios, the downsampler 308 may perform an N-bit downsampling, where N corresponds to the desired decimation ratio.

The adder 324 may comprise suitable logic, circuitry, and/or code and may be adapted to add the input to differentiators 310, 312, 314 and subtract the output of the delay ($z^{-1}$) 322 in the differentiators 310, 312, 314. In this exemplary implementation of the differentiators 310, 312, 314, the inputs may be a 15-bit value and the outputs may also be a 15-bit value. The delay ($z^{-1}$) 322 may comprise suitable logic, circuitry, and/or code and may be adapted to provide a one unit of time delay. In an exemplary implementation of the delay ($z^{-1}$) 322, the input may be 15-bit values and the output may be 15-bit values. The modulo operator 326 may comprise suitable logic, circuitry, and/or code and may be adapted to assign $x=x-2^{15}$ when $x>2^{14}-1$ and $x=x+2^{15}$ when $x<-2^{14}$, where x is the input to the modulo operator 326.

Figure 4:
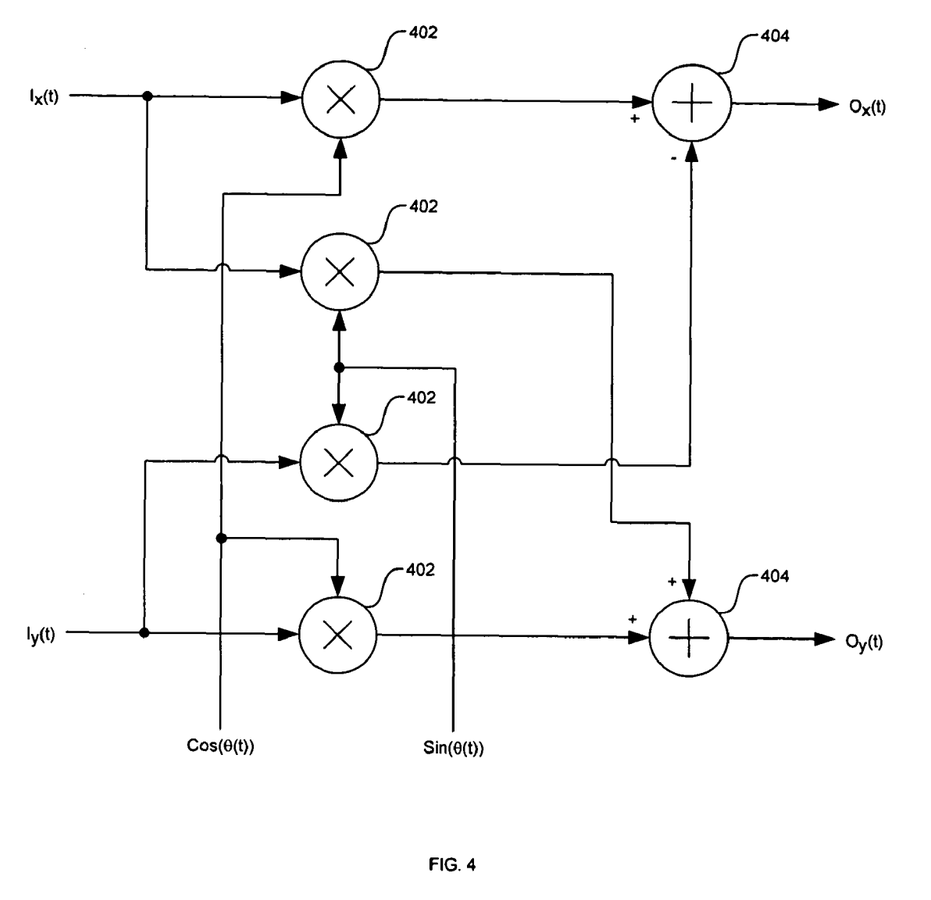
FIG. 4 illustrates a block diagram of an exemplary derotator, in accordance with an embodiment of the present invention.

FIG. 4 illustrates a block diagram of an exemplary derotator, in accordance with an embodiment of the present invention. Referring to FIG. 4, an exemplary implementation of the frequency removal function of the derotator 212 in FIG. 2 may comprise four mixers 402 and two adders 404. The mixers 402 may comprise suitable logic, circuitry, and/or code and may be adapted to mix the inputs to the derotator with the corresponding trigonometric values. The adders 404 may comprise suitable logic, circuitry, and/or code and may be adapted to add and/or subtract the outputs from mixers 402 to determine the output of the derotator.

Figure 5:
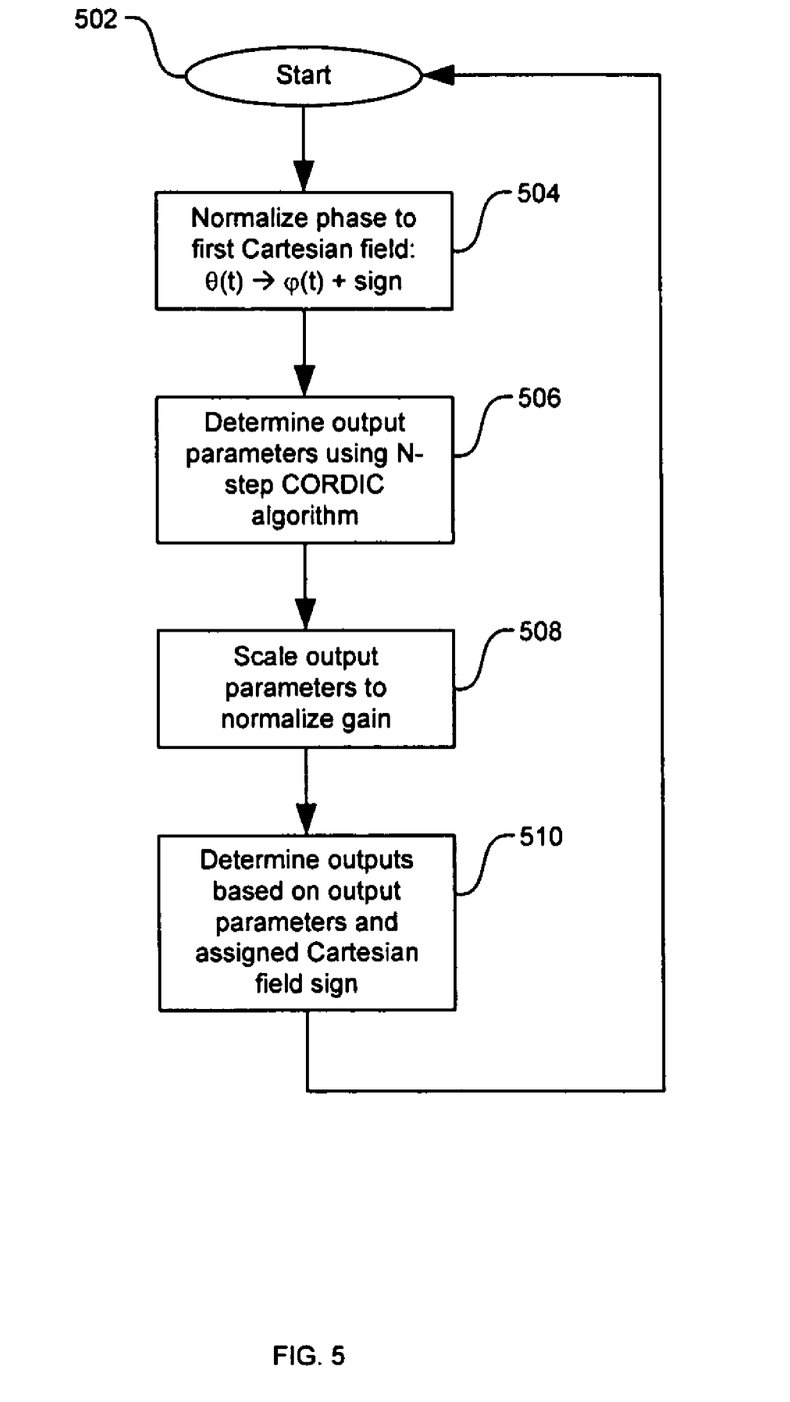
FIG. 5 illustrates an exemplary flow diagram of a CORDIC algorithm that may be utilized to determine the output of the derotator, in accordance with an embodiment of the present invention.

FIG. 5 illustrates an exemplary flow diagram of a CORDIC algorithm that may be utilized to determine the output of the derotator, in accordance with an embodiment of the present invention. Referring to FIG. 5, after start step 502, in step 504, the derotator 212 may normalize the phase to the first Cartesian field by assigning $\theta(t)$ a first Cartesian field value $\phi$ and a sign value. For example, when $\theta(t)<32768$ (or $2^{15}$), then $\phi=\theta(t)$ and sign=0; when $32768\leq\theta(t)<65536$ (or $2^{16}$), then $\phi=\theta(t)-32768$ and sign=1; when $65536\leq\theta(t)<98304$ (or $2^{17}-2^{15}$), then $\phi=\theta(t)-65536$ and sign=2; else, $\phi=\theta(t)-98304$ and sign=3.

In step 506, output parameters x and y may be determined using a CORDIC algorithm. The algorithm may begin by setting $x=I_x(t)$ and $y=I_y(t)$, where are the inputs to the derotator 212. For an N-step CORDIC algorithm a step size table STEPS[N] may be determined, where N is the step size table size and it is an integer value. The step size table may be located in the VLIF source 214 or may be retrieved by the processor 108 in FIG. 1 from a memory location and transferred to the baseband receiver interface 104. In an exemplary implementation of the CORDIC algorithm, the following steps may be taken:

```
for j = 1 to N − 1
{ d_x = x >> j;
  d_y = y >> j;
  When φ ≥ 0, then
      φ = φ − STEPS[j];
      x = x − d_y;
      y = y + d_x;
  else
      φ = φ + STEPS[j];
      x = x + d_y;
      y = y − d_x; } ,
``` where j is a counter value, N is the size of the step size table STEPS[N], $d_x$ and $d_y$ are temporary variables, and STEPS[j] corresponds to the jth entry in STEPS[N]. The operation $d_y=y>>j$ represents a right shift of the output parameter y by a number of bits indicated by the counter value j.

In step 508 in FIG. 5, the output parameters x and y may be scaled to normalize the gain produced by the loop operations in step 506. In this exemplary CORDIC implementation, the scaling of the output parameters may be x=round (x*311/512) and y=round (y*311/512), where round represents a rounding operation.

In step 510, the outputs $O_x(t)$ and $O_y(t)$ may be determined based on the output parameters x and y from step 508 and the sign values determined in step 504. For example, when sign=0, then $O_x(t)=x$ and $O_y(t)=y$; when sign=1, then $O_x(t)=-y$ and $O_y(t)=x$; when sign=2, then $O_x(t)=-x$ and $O_y(t)=y$; and when sign=4, then $O_x(t)=y$ and $O_y(t)=-x$. When the values for the outputs $O_x(t)$ and $O_y(t)$ have been determined in step 510, the derotator 212 may return to start step 502 to remove the VLIF frequency from the next I/Q data signal to arrive.

The baseband receiver interface 104 in FIG. 1 enables the baseband processor 106 to receive I/Q data signal from a conventional RF analog interface, a VLIF analog interface, and a digital interface with a cost-effective and flexible architecture.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing baseband signals, the method comprising:
    performing in one or more processors and/or circuits, functions comprising:
        selecting between an analog interface and a digital interface to receive an I/Q data signal from a front-end receiver; and
        decimating said received I/Q data signal before it is transferred to a baseband processor.

2. The method according to claim 1, comprising selecting said analog interface from a conventional analog interface or a VLIF analog interface.

3. The method according to claim 1, comprising digitizing said I/Q data signal when received from said analog interface.

4. The method according to claim 3, comprising detecting saturation in said digitization of said received I/Q data signal when a determined average value is greater than a threshold value.

5. The method according to claim 1, comprising removing a VLIF frequency when said selected analog interface is a VLIF analog interface.

6. The method according to claim 5, comprising removing said VLIF frequency utilizing a derotation function based on a CORDIC algorithm.

7. The method according to claim 5, comprising programming said VLIF frequency.

8. The method according to claim 5, comprising determining a phase and a phase increment for removing said VLIF frequency.

9. The method according to claim 5, comprising normalizing a phase to a first Cartesian field and assigning a sign value.

10. The method according to claim 5, comprising normalizing a plurality of output parameters.

11. The method according to claim 5, comprising assigning to a plurality of outputs corresponding output parameters based on a sign value.

12. The method according to claim 1, comprising converting said I/Q data signal from a digital serial format to a digital parallel format when said selected interface is a digital interface.

13. A system for processing baseband signals, the system comprising:
one or more processors that are operable to select between an analog interface and a digital interface to receive an I/Q data signal from a front-end receiver; and
a baseband receiver interface that is operable to decimate said received I/Q data signal before it is transferred to a baseband processor.

14. The system according to claim 13, wherein said one or more processors are operable to select said analog interface from a conventional analog interface or a VLIF analog interface.

15. The system according to claim 13, wherein an ADC in said baseband receiver interface is operable to digitize said I/Q data signal when received from said analog interface.

16. The system according to claim 15, wherein a saturation detector in said baseband receiver interface is operable to detect saturation in said digitization of said received I/Q data signal when a determined average value is greater than a threshold value.

17. The system according to claim 13, wherein a derotator in said baseband receiver interface is operable to remove a VLIF frequency when said selected analog interface is a VLIF analog interface.

18. The system according to claim 17, wherein said derotator is operable to remove said VLIF frequency based on a CORDIC algorithm.

19. The system according to claim 17, wherein said one or more processors are operable to program said VLIF frequency into a memory.

20. The system according to claim 17, wherein said one or more processors are operable to determine a phase and a phase increment for removing said VLIF frequency.

21. The system according to claim 17, wherein one or more processors are operable to normalize a phase to a first Cartesian field and assigns a sign value.

22. The system according to claim 17, wherein said derotator is operable to normalize a plurality of output parameters.

23. The system according to claim 17, wherein said derotator is operable to assign to a plurality of outputs corresponding output parameters based on a sign value.

24. The system according to claim 13, wherein a serial-to-parallel converter is operable to convert said I/Q data signal from a digital serial format to a digital parallel format when said selected interface is a digital interface.

25. A baseband receiver interface for processing baseband signals, said baseband receiver interface comprising:
an analog filter coupled to an ADC;
said ADC coupled to a saturation detector and to a first decimator;
said first decimator coupled to a second decimator;
said second decimator coupled to a derotator and a first multiplexer;
said derotator coupled to a VLIF source and said first multiplexer;
said first multiplexer coupled to a third decimator;
said third decimator coupled to a second multiplexer;
a serial-to-parallel converter coupled to said second multiplexer; and
said second multiplexer coupled to a fourth decimator.

* * * * *